Patented Nov. 8, 1927.

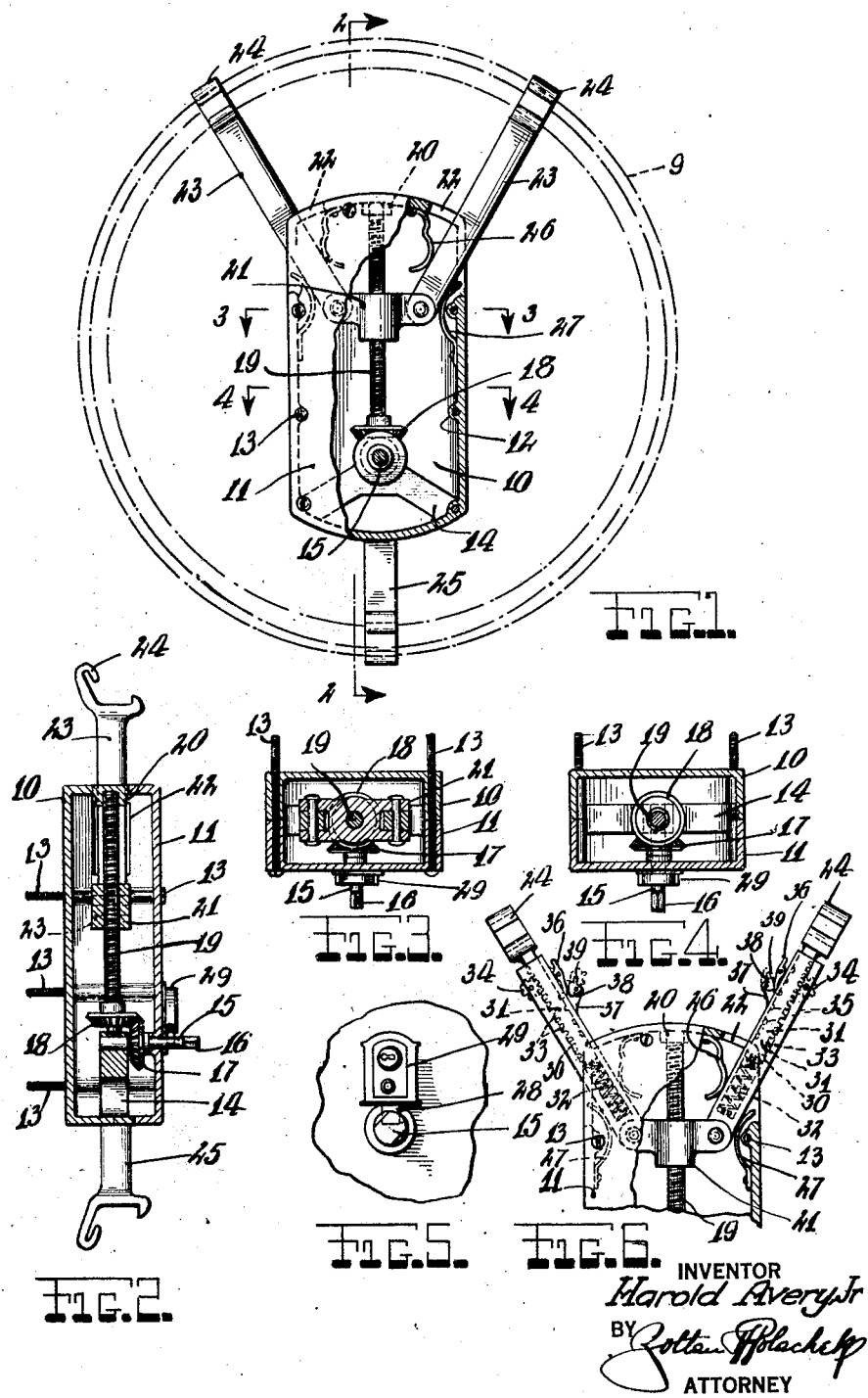

1,648,472

UNITED STATES PATENT OFFICE.

HAROLD AVERY, JR., OF LONG ISLAND CITY, NEW YORK.

SPARE-TIRE CARRIER.

Application filed October 21, 1926. Serial No. 143,089.

This invention relates generally to spare tire carriers, and has more particular reference to a novel type of combination spare tire carrier adaptable to various tires.

The invention has for an object the provision of an improved combination spare tire carrier which will operate efficiently and which can be manufactured and sold at a low cost.

For further comprehension of the invention and of the objects and advantages thereof, reference will be had to the following description and accompanying drawings and to the appended claims in which the various novel features of the invention are more particularly set forth.

Referring to the drawings forming a material part of this disclosure:

Fig. 1 is a front view of a device constructed according to this invention, certain parts being broken away to disclose the interior thereof.

Fig. 2 is a vertical sectional view taken on the line 2—2 of Fig. 1.

Fig. 3 is a horizontal sectional view taken on the line 3—3 of Fig. 1.

Fig. 4 is a horizontal sectional view taken on the line 4—4 of Fig. 1.

Fig. 5 is a fragmentary front view of portion of the device broken away in Fig. 1.

Fig. 6 is a fragmentary front view of a modification of the invention, certain parts being broken away to disclose the interior.

The reference numeral 9 is applied to certain dot and dash lines indicating the rim of a tire to which the device may be attached. The rear casing 10 abuts against a front casing 11 and both of the casings are formed with aligned bosses 12 suitably drilled to accommodate screws 13 to hold the casings together and provide for attaching to a vehicle. The standard 14 projects upwards from the bottom of casing 10 and supports a horizontal shaft 15 formed with outer flattened surfaces 16 on one end of the shaft which projects through the casing 11 and being rotatably supported in the casing 11. Fixed to shaft 15 is a bevel gear 17 meshing with another bevel gear 18 fixed to a vertical threaded shaft 19 supported at its lower end on the standard 14 and at its upper end in a boss 20 depending from the top of casing 10. A bridging member 21 is threadedly engaged on the shaft 19. The casing 10 is formed with a pair of apertures 22 and arms 23 project through the apertures, the bottom ends of the arms being pivotally connected to the bridging member. The outer extremities of arms 23 are formed with claw members 24 capable of engaging the rim 10 of a tire, not shown on the drawings. A claw member 25 rigidly projects from the bottom of casing 10. Depending from casing 10 are upper springs 26 urging the arms 23 downwards and lower springs 27 urging the same arms upwards. These springs resiliently guide the passage of the arms through their respective apertures 22 and 23, and at the same time permit a limited sidewise movement of the arms for suitably positioning and working the claws 24 on the rim 9. The shaft 15 is formed with a recess 28 engageable by a lock 29 fixed to casing 11.

A suitable tool, not shown on the drawings, may be engaged on the outer end of shaft 15, to turn the shaft, when the lock 29 is in unlocked condition. This motion will be communicated by gears 17, 18 to shaft 19 and the bridging member 21 may be raised or lowered to cause the arms 23 to change their position to hold or release the rim 10.

In the modification shown in Fig. 6, the arms 23 are formed with central bores 30 engaged by a tongue 31 projecting from the claw members 24 to permit an adjustment of the length of the arms 23 and claw members 24. The tongue members 31 are normally urged into the recess by springs 32 acting between the tongues 31 and the arms 23. One edge of the tongue members are formed with ratchet teeth 33 meshing with a ratchet wheel 34 pivotally mounted in arm 23 so that a portion projects from the arm to permit manual turning. The other edge of the tongue members are formed with a plurality of apertures 35 engageable by one end of a pawl 36 pivotally mounted in arm 23. The arm 23 is formed with a pair of projections 37 to which is pivotally attached a cam having a little operating handle 39. The cam is engageable with the pawl to lock the pawl in the apertures 35, but the pawl may be swung, as indicated by dotted lines on the drawings, to free the pawl, so that the pawl may be disengaged from the apertures, and the ratchet wheel 34 manually turned to project the claw member 24 outwards in relation to the arm 23.

My device may also be used as a tire shoe remover, by forcing one of the free ends of the tire rim toward the center by means of the claw members 24.

While I have illustrated and described my invention with some degree of particularity, I realize that in practice various alterations may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. A combination spare tire carrier, comprising claw members capable of engaging a tire rim and means for adjusting said claw members, said means comprising a bridging member, means for moving said bridging member, some of said claw members being pivotally attached to said bridging member and springs for resiliently guiding said claw members while permitting limited sidewise movement thereof.

2. A device of the class described, comprising a rear casing, a front casing abutting said rear casing, means for holding said casings together, a standard projecting upwards from the bottom of said rear casing, a shaft pivotally mounted in said standard and said front casing, one end of said shaft projecting from said front casing, flats formed on the said projecting end, said shaft being formed with a recess, a locking device on said front casing, engageable with said recess, a bevel gear fixed on said shaft, a threaded shaft rotatably supported between said standard and the top of the rear casing, a second bevel gear fixed on said threaded shaft, and meshing with said first mentioned bevel gear, a bridging member threadedly engaged on said threaded shaft, arms pivoted to said bridging member, said rear casing being formed with apertures through which said arms project, the outer ends of said arms being formed with claw portions, upper springs fixed to said rear casing and urging said arms downwards, lower springs fixed to said rear casing and urging said arms upwards, said upper and lower springs being adapted to resiliently guide the passage of said arms through said apertures and a claw member rigidly projecting from the bottom of the rear casing.

3. A device of the class described, comprising a rear casing, a front casing abutting said rear casing, means for holding said casings together, said means comprising screws engaging in bosses on said casings, a standard projecting upwards from the bottom of said rear casing, a shaft pivotally mounted in said standard and said front casing, one end of said shaft projecting from said front casing, flats formed on the said projecting end, said shaft being formed with a recess, a locking device on said front casing, engageable with said recess, a bevel gear fixed on said shaft, a threaded shaft rotatably supported between said standard and the top of the rear casing, a second bevel gear fixed on said threaded shaft, and meshing with said first mentioned bevel gear, a bridging member threadedly engaged on said threaded shaft, arms pivoted to said bridging member, said rear casing being formed with apertures through which said arms project, the outer ends of said arms being formed with claw portions, upper springs fixed to said rear casing and urging said arms downwards, lower springs fixed to said rear casing and urging said arms upwards, and a claw member rigidly projecting from the bottom of the rear casing, said upper and lower springs being adapted to resiliently guide the passage of said arms through the apertures of said casing while permitting sidewise movement of said arms to enable placement of said claw members.

4. A device of the class described, comprising a rear casing, a front casing abutting said rear casing, means for holding said casings together, a standard projecting upwards from the bottom of said rear casing, a shaft pivotally mounted in said standard and said front casing, one end of said shaft projecting from said front casing, flats formed on the said projecting end, said shaft being formed with a recess, a locking device on said front casing, engageable with said recess, a bevel gear fixed on said shaft, a threaded shaft rotatably supported between said standard and the top of the rear casing, a second bevel gear fixed on said threaded shaft, and meshing with said first mentioned bevel gear, a bridging member threadedly engaged on said threaded shaft, arms pivoted to said bridging member, said rear casing being formed with apertures through which said arms project, the outer ends of said arms being formed with claw portions, means for adjusting the length of said arms, a catch for retaining said arms in adjusted extended position, springs associated with said arms for retracting the same when said catch is released; upper springs fixed to said rear casing and urging said arms downwards, lower springs fixed to said rear casing and urging said arms upwards, and a claw member rigidly projecting from the bottom of the rear casing, said upper and lower spring being adapted to resiliently guide the passage of said arms through said apertures while permitting limited freedom of sidewise movement to suitably position said claw members.

5. A device of the class described, comprising a rear casing, a front casing abutting said rear casing, means for holding said casings together, a standard projecting upwards from the bottom of said rear casing, a shaft pivotally mounted in said standard and said front casing, one end of said shaft projecting from said front casing, flats formed on the said projecting end, said shaft being formed with a recess, a locking device on said front casing, engageable with said recess, a bevel gear fixed on said shaft, a threaded shaft rotatably supported between said standard and the top of the rear casing, a second bevel gear fixed on said threaded shaft, and meshing with said first mentioned bevel gear, a bridging member threadedly engaged on said threaded shaft, arms pivoted to said bridging member, said rear casing being formed with apertures through which said arms project, the outer ends of said arms being formed with claw portions, means for adjusting the length of said arms, said last mentioned means comprising a tongue formed on said claw portion and engaging in a central bore in said arm, a ratchet formed on one edge of said tongue, a ratchet wheel pivoted in said arm, projecting from said arm, and meshing with said ratchet, means for locking said tongue in various positions, and a spring for urging said tongue inwardly when said locking member is released, upper springs fixed to said rear casing and urging said arms downwards, lower springs fixed to said rear casing and urging said arms upwards, and a claw member rigidly projecting from the bottom of the rear casing.

In testimony whereof I have affixed my signature.

HAROLD AVERY, Jr.